United States Patent
Thiesfeld et al.

(10) Patent No.: US 6,728,855 B2
(45) Date of Patent: Apr. 27, 2004

(54) METHOD AND SYSTEM FOR DATA PATH VERIFICATION

(75) Inventors: Charles William Thiesfeld, Lakeville, MN (US); Michael Howard Miller, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 11 days.

(21) Appl. No.: 10/184,757

(22) Filed: Jun. 27, 2002

(65) Prior Publication Data

US 2003/0093633 A1 May 15, 2003

Related U.S. Application Data

(63) Continuation-in-part of application No. 10/086,918, filed on Feb. 28, 2002.
(60) Provisional application No. 60/349,953, filed on Jan. 17, 2002, and provisional application No. 60/325,340, filed on Sep. 27, 2001.

(51) Int. Cl.[7] .............................................. G06F 12/00
(52) U.S. Cl. ..................... 711/170; 711/154; 711/112; 711/111; 714/715
(58) Field of Search ................................ 711/170, 154, 711/112, 111; 715/715

(56) References Cited

U.S. PATENT DOCUMENTS

| | | | |
|---|---|---|---|
| 5,210,660 A | 5/1993 | Hetzler | 359/341.44 |
| 5,713,006 A | 1/1998 | Shigeeda | 711/170 |
| 6,286,057 B1 | 9/2001 | Cornaby et al. | 710/5 |
| 6,286,061 B1 | 9/2001 | Ross | 710/33 |
| 6,292,911 B1 | 9/2001 | Swanson | 714/715 |
| 6,301,637 B1 | 10/2001 | Krull et al. | 711/112 |
| 6,304,925 B1 | 10/2001 | Liu et al. | 710/62 |

Primary Examiner—Kevin Verbrugge
Assistant Examiner—Mehdi Namazi
(74) Attorney, Agent, or Firm—David K. Lucente; Derek J. Berger

(57) ABSTRACT

A system and method of verifying data transferred along a data path from one buffer, such as a user buffer in the host system to a second buffer, such as a disc drive buffer on a disc drive system by using the receiving device to test the information and provide a confirmation or error signal to the sending device. The system and method appends non-abstract identification tags to the abstract data in the first buffer, i.e., the data to be stored to and/or read from the storage device. The tags are transmitted along with the abstract data and provide unique information that is used by either the disc drive device or the host system to validate data received from the other. The validation is based on a comparison of the tag values to a predetermined control value that may be received prior to receiving the abstract data.

24 Claims, 11 Drawing Sheets

METHOD AND SYSTEM FOR DATA PATH VERIFICATION

RELATED APPLICATION

This application is a continuation-in-part of U.S. patent application Ser. No. 10/086,918, titled METHOD AND SYSTEM FOR DATA PATH VERIFICATION, which was filed on Feb. 28, 2002. This application also claims priority of U.S. Provisional Application Serial No. 60/325,340, titled DATA PATH VERIFICATION IMPLEMENTED IN THE STORAGE DEVICE, filed Sep. 27, 2001, which is incorporated herein by reference. This application further claims priority of U.S. Provisional Application Serial No. 60/349,953, titled DATA PATH VERIFICATION IMPLEMENTED IN THE STORAGE DEVICE IMPROVEMENT, filed Jan. 17, 2002, which is incorporated herein by reference.

FIELD OF THE INVENTION

The present invention relates to systems for verifying data transferred between a user buffer and a storage device. More particularly, the present invention relates to use of characters combined with data to verify the validity of data, as well as the integrity of the data path.

BACKGROUND OF THE INVENTION

In a typical computer system, a host computer system communicates with a disc drive or some other storage device to store and retrieve data. The host system generally includes a host microprocessor and other related items, such as drivers, buffers and other communication elements. The disc drive, on the other hand, relates to a storage media, such as one or more magnetic discs, a disc drive microprocessor, a storage buffer, as well as other related software and hardware. Data is transferred between the host system and the disc drive along a data path.

When data is to be stored on the storage device, the host system initially stores the data in a user buffer. Once stored in the buffer, the host sends a write command to the storage device, along with a pointer or some other address information related to the location of the data in the user buffer. Upon receiving the write command, the disc drive is responsible for accessing the information in the user buffer through a series of requests to a memory controller, such as a Direct Memory Access (DMA) controller. Upon receiving a request for the data, the DMA controller transmits the data across the data path to the disc drive, where the information may be stored in a disc drive buffer. Once received, the disc drive stores the data to the storage media.

Similarly, during a read operation, the host typically sends a read command to the disc drive, which, in turn, retrieves data from the storage media and stores the information in the disc drive buffer. The data is then transmitted along the data path to the user buffer. Once the information is in the user buffer, the host may access and use the data for its intended purpose.

Often, the data received or sent by the disc drive system is invalid or corrupt, i.e., not the same as the original data that host requested to be stored or retrieved. The reasons for such corruption may be several. For instance, the user or storage buffer may be modified prior to the actual transfer of the data, the address information may be incorrect and/or the data path may cause or otherwise create errors in the data, among others. These errors or inconsistencies in the stored data may result in significant problems in the operation of the computer system. Consequently, there is a need to verify that the data transmitted along the data path is not corrupt.

One method of verifying that the data is not corrupt relates to comparing stored data with data in the user buffer. That is, in one system, upon storing data on the storage media, the disc drive may transmit a notification to the host that the data has been stored. Upon receiving such a notification, the host may then send a read command to the disc drive, intending to read the information that was just stored. In this case, the disc drive then reads the data from the storage media and transmits the data to the host. The host is then able to perform a direct comparison between data stored on the storage media and the data in the user buffer.

This method of verifying data, unfortunately, requires that the data in the user buffer be maintained until that data is stored to the disc drive and retrieved from the disc drive, which significantly impacts the performance of the computer system as other resources may need to wait to use the buffer space. Moreover, re-reading the data from the storage media and transferring all the data back to the host system just to check data validity consumes a significant amount of time and resources, which also impairs performance. Consequently, many drives simply do not check the validity of the data path and suffer from poor reliability. Therefore, there is a need for a system and method of verifying the data by the host computer system and the disc drive that data is received from the other.

It is with respect to these and other considerations that the present invention has been made.

SUMMARY OF THE INVENTION

The present invention relates to a system and method of verifying data that has been transferred along a data path from one buffer, such as a user buffer in the host system to a second buffer, such as a disc drive buffer on a disc drive system by using the receiving device to test the information and provide a confirmation or error signal to the sending device. Thus, an embodiment relates to using the disc drive storage device to verify the data without sending all the data back to the host system. Indeed, the storage device can confirm the validity of the data or report errors back to the host system. Similarly, in another embodiment, when data is transferred from the disc drive system back to the host system, the host system can perform a comparison that detects whether errors have occurred during the transfer of information.

In order to achieve the validity testing, the system and method relates to using non-abstract identification tags that are appended to or otherwise merged with the abstract, application data to be stored to and/or read from the storage device. These tags, in essence, provide unique information that could be used by either the storage device or the host system to validate data received from the other by comparing the tag values to a predetermined control value that may be received prior to receiving the abstract data. In an embodiment, the system has a host computer system that has a file system with direct access to the user buffer. The file system injects an incrementing tag at sector boundaries of the user buffer. The tag may be confirmed both at the host interface of the disc drive device and during the process of writing to the storage media. In one embodiment, a check character is actually written to the media along with the user data in each sector.

With respect to certain aspects, the present invention relates to a system and method of verifying data transferred between a host computer system and a disc drive system along a data path. The system and method involves storing the data in a first buffer; storing an identification tag in the first buffer, the identification tag associated with the data in the user buffer; transferring a request to transfer the data wherein the request indicates the location of the data, the request further including identification information related to the identification tag; determining a control tag value based on the received identification information; transferring the data and associated identification tag from the first buffer along the data path to a second buffer; and comparing the control tag value to the identification tag received with the data to determine validity of the data.

In another embodiment, the first buffer is a user buffer located on the host computer system and the request to transfer information relates to a write command and the act of storing the data into the user buffer is performed by a file system module. In an alternative embodiment however, the act of storing the data into the user buffer may be performed by an application module. In yet another embodiment the first buffer is a disc drive buffer located on the disc drive system and the request to transfer relates to a read request conducted by the host computer system to the disc drive system.

Another embodiment relates to a system and method of verifying data as discussed above with respect to a write command but wherein the act of storing the data into the user buffer further involves dividing the user buffer into a plurality of sectors; storing data into the sectors; and appending identification tags to the end of each sector, wherein each subsequent identification tag is an incremented value of the previous identification tag. Additionally, the embodiment may involve determining control tag values for each sector based on information received in the request to transfer and comparing each of the control tag values to the identification tags received with the data to determine validity of the data. In yet another embodiment, upon receiving the data and associated tag information, the system and method inserts a logical block address value into each data sector, calculates a cyclic redundancy check value for the sector with the logical block address, and then stores the cyclic redundancy check value onto a storage medium with the data such that the logical block address can be determined at a later time.

In yet another embodiment, instead of appending the identification tag to each sector of abstract data, a table of such information is maintained. Further, the system and method calculates an error detection value, such as a CRC value for the identification tag and the abstract data. For instance the CRC value and the abstract data value are combined and a CRC value is calculated using the two values. Consequently, the embodiment calculates a first error detection value, the error detection value relating to both the identification tag and the associated data in the first buffer. The CRC value is then transferred along the data path with the abstract data. Next, a recalculation occurs, wherein the recalculation relates to recalculating the error detection value using the received abstract data and the identification tag to generate a second error detection value. Upon recalculating the second error detection value, the embodiment compares the second error detection value to the first error detection value received with the data to determine validity of the data. Typically, the recalculation algorithm is the same predetermined cyclic redundancy check algorithm used to generate the first error detection value.

The invention may be implemented as a computer process, a computing system, or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detailed description and presently preferred embodiments of the invention, and to the appended claims.

DETAILED DESCRIPTION

Figure 1:
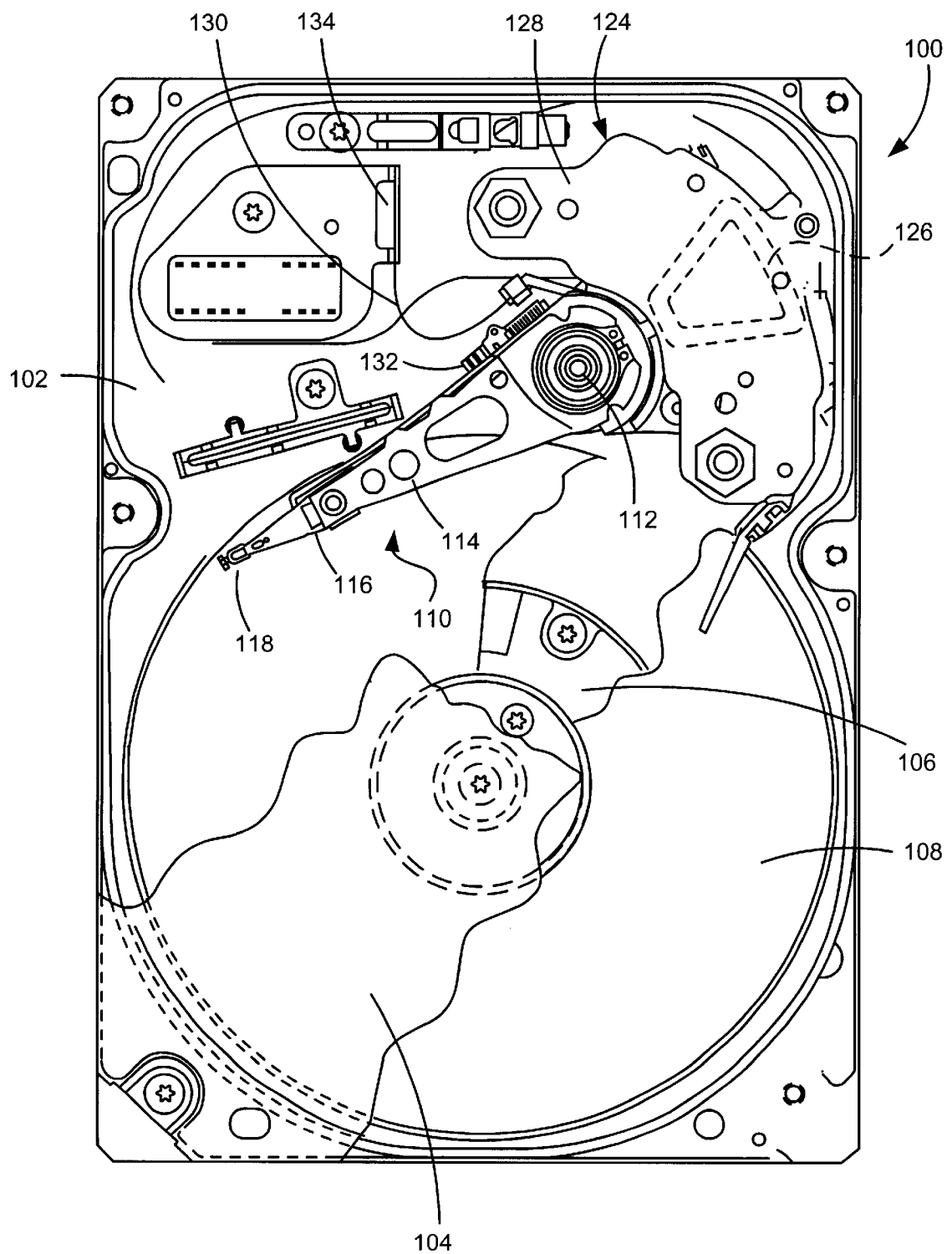
FIG. 1 illustrates a disc drive storage media device that incorporates aspects of the present invention.

In general, the present disclosure describes methods and systems for verifying data that has been transferred between a host computer system and a disc drive device. A disc drive device 100 that may incorporate aspects of the present invention is shown in FIG. 1. It should be understood that other environments that transfer data between separate entities, such as other computing environments and non-disc drive related environments, are contemplated and may be within the scope of the present invention. Indeed, the following description with respect to FIG. 1 relates to one such environment.

In an embodiment, the disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider enabling the head 118 to move or fly in close proximity above the corresponding surface of the associated disc 108.

During operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base 102 to a disc drive printed circuit board (not shown) mounted to the bottom side of the disc drive 100. The printed circuit board is used to connect the disc drive 100 to a host computer system and control many of the functional operations of the disc drive 100.

Figure 2:
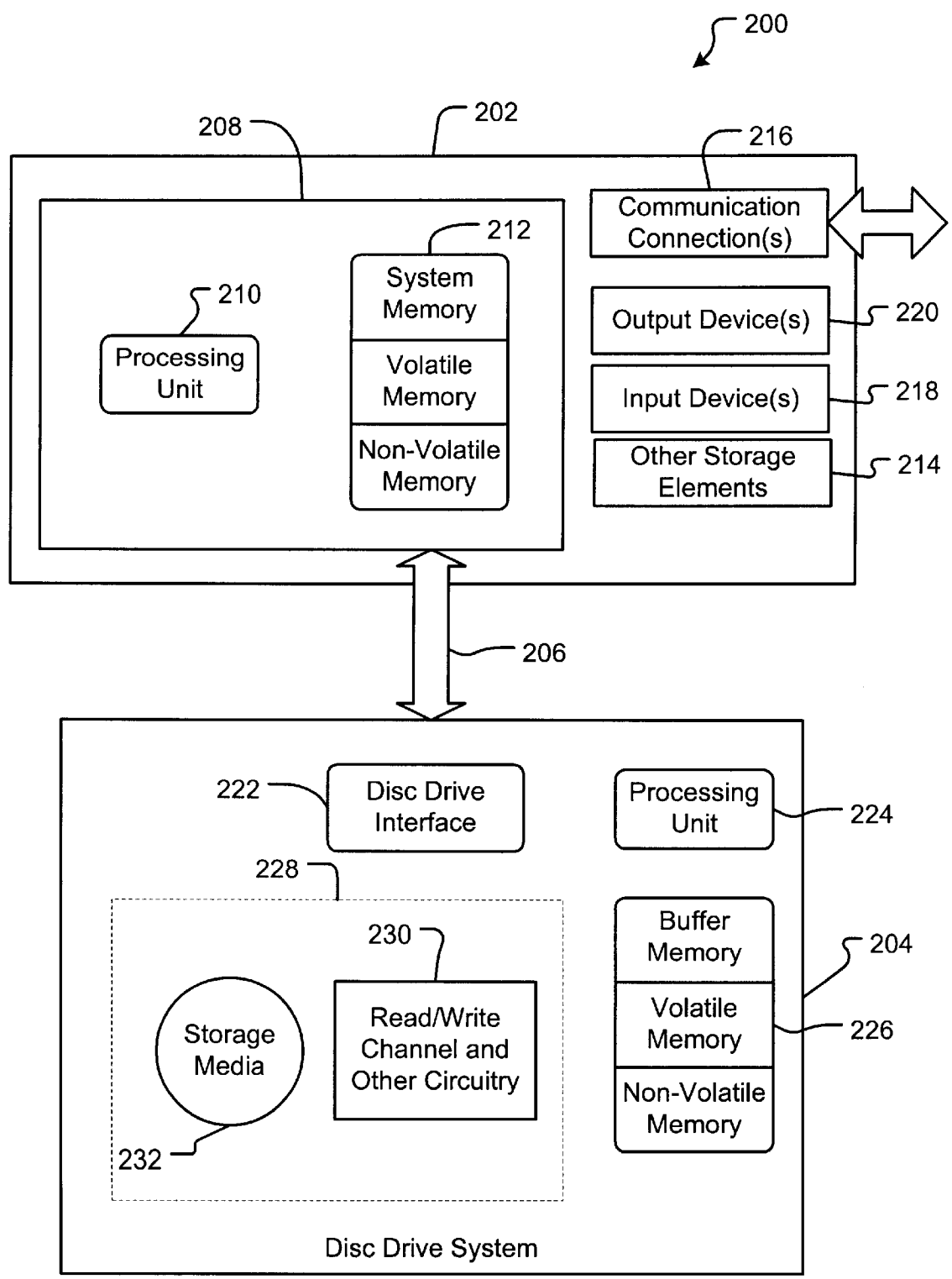
FIG. 2 illustrates a system configuration that incorporates aspects of the present invention, including electronic elements of the disc drive shown in FIG. 1 which contains processing elements for exchanging data with a host computer system.

FIG. 2 is a block diagram illustrating an environment 200 having a host computer system 202 that communicates with a disc drive system 204 along a data path 206. In an embodiment, the disc drive system 204 is similar to the drive 100 shown and described in conjunction with FIG. 1. The data transmitted to the disc drive 204 along path 206 is verified by the disc drive system 204 to ensure the integrity of the data that is ultimately stored to the media 232 of the system 204.

In its most basic configuration, the host computing system 202 is illustrated in FIG. 2 by line 208. The host 208 has at least one processor 210 and a memory 212. The microprocessor 210 is of familiar design and includes a collection of registers (not shown) for temporary storage of data and instructions. The microprocessor 210 may have any of a variety of architectures including, but not limited to those architectures currently produced by Intel, Cyrix, AMD, IBM and Motorola. The processor 210 uses memory 212 for many purposes, including as a user buffer to temporarily store data for use by the system 200. Depending on the configuration and type of computing device, memory 212 may be volatile, non-volatile or some combination of the two. Besides the disc drive system 204 and the buffer 212, system 200 may also include additional storage 214 including, but not limited to, other magnetic disc drives, optical disc drives, and/or tape storage devices.

Host system 202 may also contain communications connection(s) 216 that allow the device to communicate with other computing devices. Additionally, system 202 may have input device(s) 218 such as keyboard, mouse, pen, voice input device, touch input device, etc. Output device(s) 220 such as a display, speakers, printer, etc. may also be included. All these devices are well known in the art and need not be discussed at length here.

Both host computer system 202 and disc drive system 204 typically include at least some form of computer readable media. Computer readable media can be any available media that can be accessed by either system 202 or disc drive system 204. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

With respect to the disc drive 204, it generally has a printed circuit board portion that comprises multiple functional components which are used to control the operation of the disc drive 204. For instance, the drive 204 has an interface application specific integrated circuit 222 that operably connects to an interface (not shown) in the host computer system 208. The interface 222 is controlled by a processing unit 224 and typically uses an associated disc buffer 226 to provide high-speed data transfer between the host computer 208 and the disc drive 204. Data to be written to the disc drive 204 is passed from the host computer to the interface 222 and then to a head disc assembly 228. The head disc assembly 228 has a read/write channel 230, which encodes and serializes the data and provides the requisite write current signals to the heads that are used to place a magnetic pattern on the storage media 232. To retrieve data that has been previously stored by the disc drive 232, read signals are generated by the heads in the presence of a magnetic field and provided to the read/write channel 230, which performs decoding and error detection and correction operations and sends the retrieved data to the interface 222 for subsequent transfer to the host computer 208. Such operations of the disc drive 204 are well known in the art and are discussed, for example, in U.S. Pat. No. 5,276,662 issued Jan. 4, 1994 to Shaver et al.

In an exemplary embodiment of the present invention, the logical operations of the invention are implemented (1) as a sequence of microprocessor implemented acts or program modules running on a processing unit, such as 210 or 224, and/or (2) as interconnected machine logic circuits or circuit modules within either the host computer system 208 and/or the disc drive 204. The implementation is a matter of choice dependent on performance requirements. Accordingly, the logical operations making up the embodiments of the present invention described herein are referred to variously as operations, structural devices, acts or modules. While the following embodiments of the invention are discussed as being implemented as software, it will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
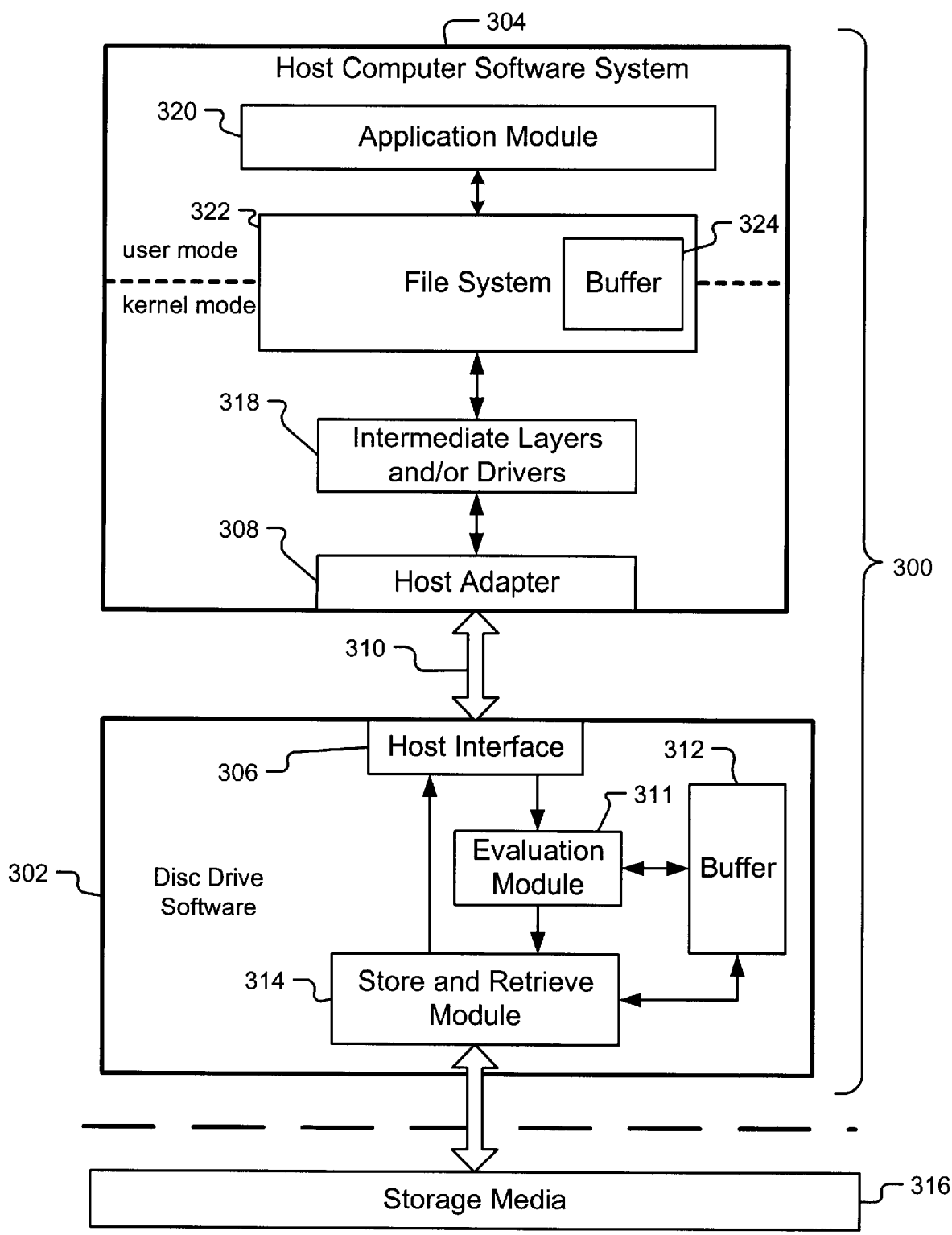
FIG. 3 illustrates a software environment according to aspects of the present invention wherein a host file system modifies information in the user buffer.

FIG. 3 illustrates a suitable software environment 300 of functional software components in which the present invention may be implemented. The software environment 300 is only one example of a suitable environment and is not intended to suggest any limitation as to the scope of use or functionality of the invention. Other well-known environments, and/or configurations that may be suitable for use with the invention may implement the present invention. As shown, FIG. 3 illustrates a functional block diagram of the software components 300 in an embodiment of the invention.

In the embodiment shown in FIG. 3, the software environment 300 comprises a disc drive system software portion 302, and a host system software portion 304. The disc drive software 302 communicates with the host computer system software 304 through the use of an interface module 306. The interface module 306 of the disc drive system communicates with a host adaptor 308 of the host computer system data path 310 as shown in FIG. 3. The host system software 304 may be associated with a host computer such as computer 208 shown and described above in conjunction with FIG. 2. Additionally, the disc drive software system 302 may be associated with a disc drive such as drive 204 also shown and described above in conjunction with FIG. 2.

Besides the interface module 306, the disc drive software system 302 includes an evaluation module 311 that receives data from the host interface module 306. The evaluation module 311 uses a buffer 312 to evaluate and validate the data received from the interface 306, as discussed below. The evaluation module 311 also communicates the data, if verified, to a store/retrieve module 314, which, in turn stores verified data to storage media 312. In an embodiment, the storage media 312 is the same as media 232 shown in FIG. 2. Additionally, the software 302 retrieves data from the storage media 312 and, in turn transmits the data to the host interface 306 to send the data to the host computer system 304.

The host computer software system 304 has an operating system that manages many of the overall functions of the hardware and software for the host computer system. The operating system is the system upon which other modules run, such as the drivers and intermediate levels of processing 318 as well as other applications, such as application module 320. The operating system 304, shown in FIG. 3, also has a file system that may operate in either a user mode or a kernel mode. The application module 320 communicates with a file system 322 in the user mode.

With respect to the driver module 318, the drivers 318 are commonly used to provide communication between the kernel mode functions and the host adapter 308. The application module 320 may access the drivers 318 through various layers of abstraction, such a file system 322 and possibly others.

In general, the file system 322 provides the overall structure in which files are named, stored and organized. That is, the file system 322 consists of files, directories, and the information needed to locate and access these items. Importantly, the file system 322 also relates to the portion of operating system 304 that translates requests for file operations from an application module 320 into lower-level, sector-oriented tasks that can be understood by the drivers 318 controlling the disc drive 302.

The file system has a user buffer 324 that is used to store and retrieve data and other information at the request of the application module 320. Alternatively, the file system 322 may store and retrieve data and information to and from the buffer 324 without a request from the application module 320, e.g., at the request of the operating system 304, the drivers 318 or according to a predetermined protocol associated with the file system 322. The data stored in the user buffer 324 may be abstract user data as provided or requested by the application module 320. Additionally, the information stored in the user buffer 324 may also be non-abstract data relating to identification tags to later provide identification capabilities of the abstract data.

In the embodiment shown in FIG. 3, the file system 322 stores the identification tag information along with the abstract data. Although the file system 322 is shown and described as the module that stores data and tag information to the user buffer 324 prior to transmitting the data and tag information to the disc drive system 302, other modules, such as application 320 may, in other embodiments, have direct access to the user buffer 324 and therefore be used to store the data and tag information to the user buffer 324.

In operation, the stored tag information is transferred along the data path 310 along with the abstract data in buffer 324 to the disc drive device 302. The tag may be validated at the host adapter 308 during the process of writing to the storage device 302. Alternatively, the host interface 306 or some other module along the data path may use the tag to determine whether the data has been corrupted. Likewise during a read operation, the file system 322 is also used to store data and tag information into the user buffer 324 when read from the disc drive system 302. As discussed below, the file system 322 may further evaluate tag information received along with data from the disc drive system 322 to determine whether the correct data has been received. In alternative embodiments, another application, such as application module 320 may have direct access to the user buffer 324 and therefore be used to check tag information stored in the buffer 324 as well.

Although many modules may perform checks of the data in the data path, a particular embodiment uses the evaluation module 311 to perform data tag evaluations to determine whether received data is valid by comparing the tag received along with the abstract data to a control or expected tag value. The control or expected value may be sent to the host interface 306 along with the initial write command, as discussed in more detail below. Similarly, when data is recovered from the storage device, a check character used to generate a read tag that the host has established via the read command, which is then delivered to the user buffer. The operating system file system 322 confirms the identification tag information upon reading data received from the data from the disc drive system.

In one embodiment, the evaluation module 311 may evaluate received tag values that are provided along the data path with the abstract data to the tag values that are transmitted with the write command. In another embodiment, the evaluation module 311 may receive an error detection value or CRC value, calculated by a predetermined algorithm using both the tag value and the abstract data. In such a case, the evaluation module 311 may recalculate the error detection value using both the tag value received with the write command and the abstract data received along the data path 310. Next, the evaluation module compares the two error detection values to determine the validity of the data.

Figure 4:
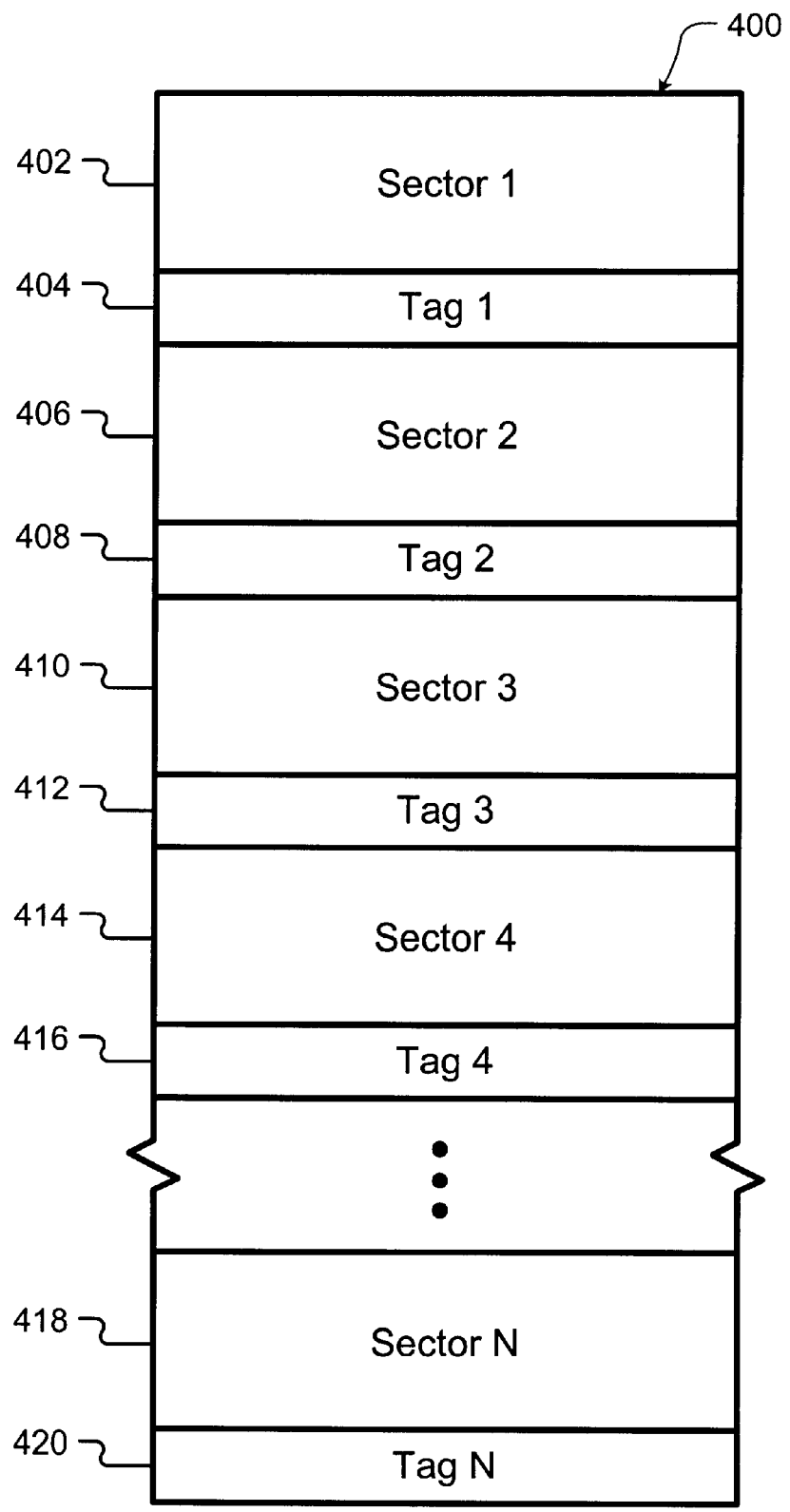
FIG. 4 illustrates a user buffer having verification tags inserted by a file system and/or an application.

In one embodiment, the abstract data that is stored in the user buffer 324 is divided into smaller segments or sectors. FIG. 4 is an illustration of a portion of a user buffer, such as buffer 324 that has been subdivided into sectors for storing a portion of data. As shown, buffer 400 has numerous sectors, such as sectors 402, 406, 410, 414 and 418. Additionally, many more sectors may be present in the buffer representation 400, i.e., there may be any number 'N' sectors as indicated by sector 418. Additionally, an application module may provide a read or write command that uses only some of the buffer space, thereby leaving some free sectors for use by other application modules or other commands.

Each sector may either be a predetermined size of memory or the sectors may be dynamically allocated as determined by the file system 322. In an embodiment, the sectors are set to coincide with the size of the sectors on the physical storage media 316.

The data stored in the sectors 402, 406, 410, 414 and 418 relates to abstract data provided by the application module 320, e.g., application data or code. The abstract data stored in sectors 402, 406, 410, 414 and 418 may either be data that is going to be written to the disc system 302 or it may relate to data that has been recently read from the disc drive system 302 and is about to be accessed by the application module 320. Additionally, the application module 320 may provide a read or write command that relates to data stored in a number of consecutive sectors, such as sectors 402, 406, 410, and 414.

With respect to an embodiment of the invention, the buffer 400 has a tag portion for each sector. For instance the first sector 402 has a tag portion 404, the second sector 406 has a tag portion 408, and so on. The tag portion stores tag information associated with its sector, wherein the tag information is used to uniquely identify the data in its sector as valid or invalid data. The tag information stored in the tag portions 404, 408, 412, 416, and 420 is considered non-abstract data, i.e., data stored in the buffer for use by the system to determine the validity of the abstract data. Although shown as having a tag portion associated with each sector, alternative embodiments may provide one tag for one or more sets of sectors. Additionally, the tag portions 404, 408, 412, 416, and 420 may be physically next to or located apart from associated sectors.

In a particular implementation, the user buffer 400 will contain a 32-bit tag appended to the end of each sector, such as sectors 402, 406, 410, 414 and 418, in the buffer 400. When a read or write command involves multiple sectors, the first tag is selected at random by the file system 322 to make it unique from all other tags in memory. This tag is communicated to the storage device 302 when the write command is given. The write command code itself provides an indication that the data field in the buffer has such tag information added. Each successive sector of the data has a tag value and the tag value may be an incremented value as compared to the initial tag value. Thus, when each tag is retrieved by the device 302 along with the abstract data to be stored, each tag may be compared to either the initial tag value provided in the write command itself or to an associated, calculated incremental tag value, as discussed in more detail below with respect to FIG. 5.

Figure 5:
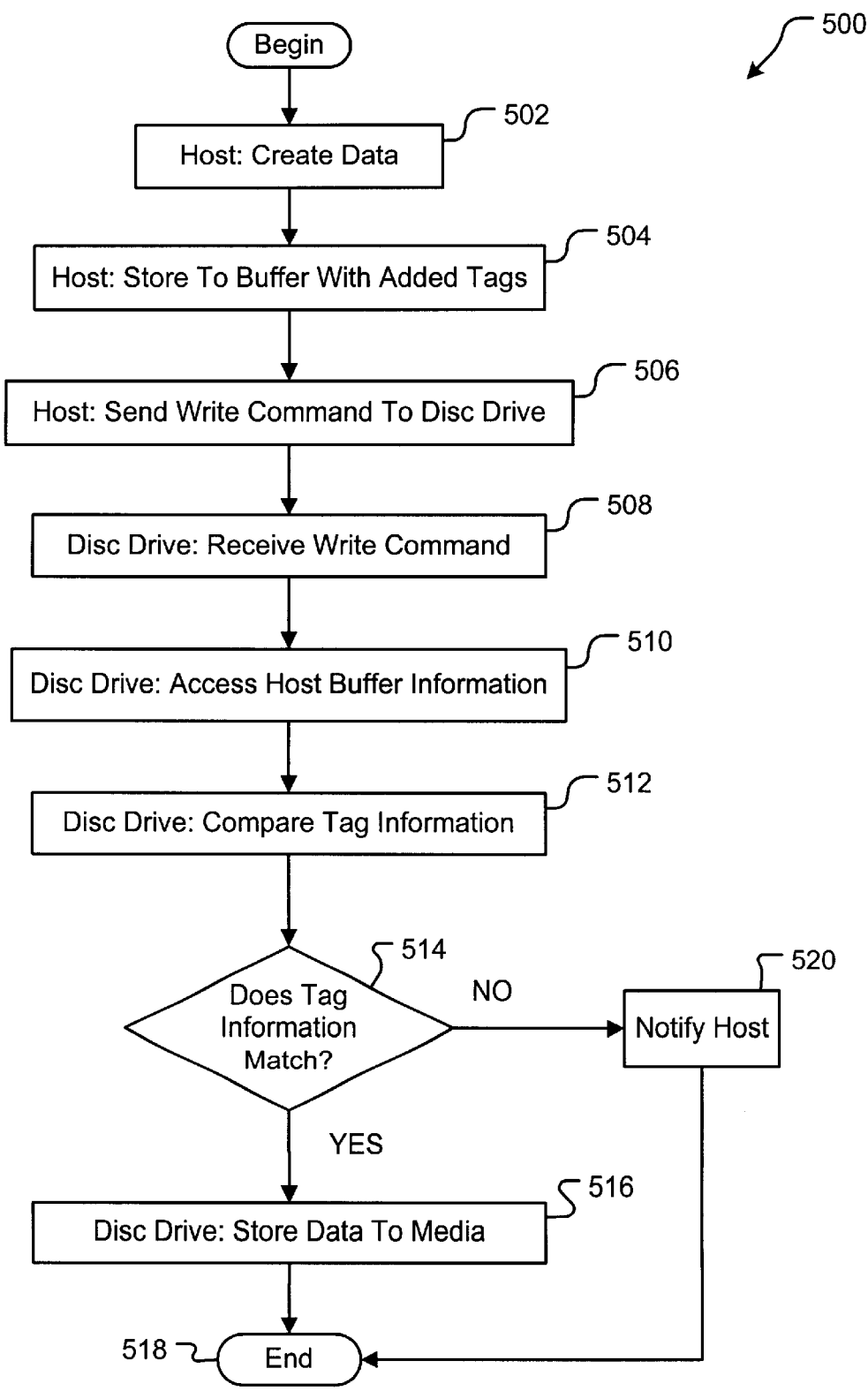
FIG. 5 illustrates a flow chart of functional operations related to writing data to a storage media in accordance with aspects of the present invention.

FIG. 5 illustrates the functional components or operational flow characteristics related to writing data to a storage media in accordance with certain aspects of the present invention. To begin, abstract data is created by the application module, such as module 320 or some other module in the system 304. The creation of this data is represented by create operation 502. Moreover, create operation 502 indicates that the host, i.e., some module on the host, performs the creation. In alternative embodiments, other modules may create the data. Upon creation of the data, a write command may be generated by the creating module providing an indication that the data should be written to the disc drive system, such as system 302 shown in FIG. 3.

Next, store operation 504 stores the data in the buffer, such as user buffer 324, dividing the information into sectors. Store operation 504 also stores one or more non-abstract tags to the buffer to mark the data with a unique value. In an embodiment, a 32-bit tag is added to the end of each sector. Alternative embodiments may use larger or smaller tags and/or provide one for more than one sector. In a particular embodiment, each consecutive sector receives a 32-bit tag that is one incremental value larger or smaller than the tag value for the previous sector. An example method related to adding multiple tag values is shown and described below in conjunction with FIG. 7.

In one embodiment, the file system, such as file system 322 (FIG. 3) performs the acts of storing the abstract data in the various sectors as well as the act of adding tag values to each sector. In other embodiments however, other modules having direct access to such a buffer, such as buffer 324 (FIG. 3) may perform the act of storing either the abstract data to the buffer or the act of storing non-abstract tag values to the buffer, or, in one embodiment, both acts of storing abstract data and tag values to the buffer.

Once the data has been stored in the user buffer with the associated tags, send operation 506 sends a write command to the disc drive. The write command typically provides a memory address identifying the location of the first sector in the group of sectors to be written to the disc drive system as well as the number of sectors in the group. The write command also provides an indication that the tag values are stored within the buffer. Furthermore, the write command provides either a tag value for the first sector in the group or some information such that the tag value can be independently determined apart from accessing the tag from the buffer itself.

Following send operation 506, receive operation 508 receives the write command. In an embodiment, the disc drive system, such as system 302 receives the command. More particularly still, the host interface 306 may receive the write command.

Upon receiving the write command, access operation 510 begins the process of accessing host buffer information.

Access operation 510 typically relates to the steps of communicating back to the host adapter 308 and the drivers 318 that certain buffer information should be transferred to the disc drive software 302. The request simply accesses buffer data and causes the transfer of a block of such data, such as consecutive sectors, from the user buffer 324 to the disc drive system. The data, i.e., both abstract data and non-abstract tag data is then stored in or copied to the drive buffer 312.

In one embodiment, once the data has been transferred to the disc drive system 302, compare operation 512 begins the compare function to effectively compare the tag information associated with the write command to the tag information retrieved along with the data from the user buffer 324. Operation 514 determines if the tag information matches. If so, then flow branches YES to store operation 516 which actually stores the data on the physical media. The tag information may or may not be stored with the data. Once stored, flow ends at end operation 518.

On the other hand, if determination operation 514 determines that the tag information does not match, then flow branches NO to notify operation 520 which notifies the host that the tags do not match and that the write command should be resubmitted. Upon notifying the host, flow 500 ends at end operation 518.

In an alternative embodiment, the data is stored to the media prior to the compare operation 512 and 514. Thus, the drive system may provide an error notification to the host only if the proper data was not stored to the media. Similarly, in this embodiment, the host recognizes that if no error is received, then there is a high probability that the correct data has not only been received by the disc drive system but also stored to the media. In an embodiment, some tag information should be stored with the data in order to provide an accurate comparison following the read operation. In one embodiment, prior to storing the data on the media, the tag is replaced with the LBA (Logical Block Address) of the sector to be written to the media. A CRC (Cyclic Redundancy Check) character is calculated over the sector and the substituted LBA value. In this case, the LBA value is not actually written to the media to conserve space since that can be recalculated when the data is recovered from the media. The CRC character, however, is written to the media within each sector. The CRC character may be confirmed and thus provide an added level of confidence with respect to the validity of the data actually transferred to the media.

In yet other embodiments, the data tags may be checked at other points along the data path in order to accurately determine errors and where they occur. Also, other embodiments may actually provide acknowledgement information back to the host to indicate that the tag information matched and thus the data appeared to be correct.

Figure 6:
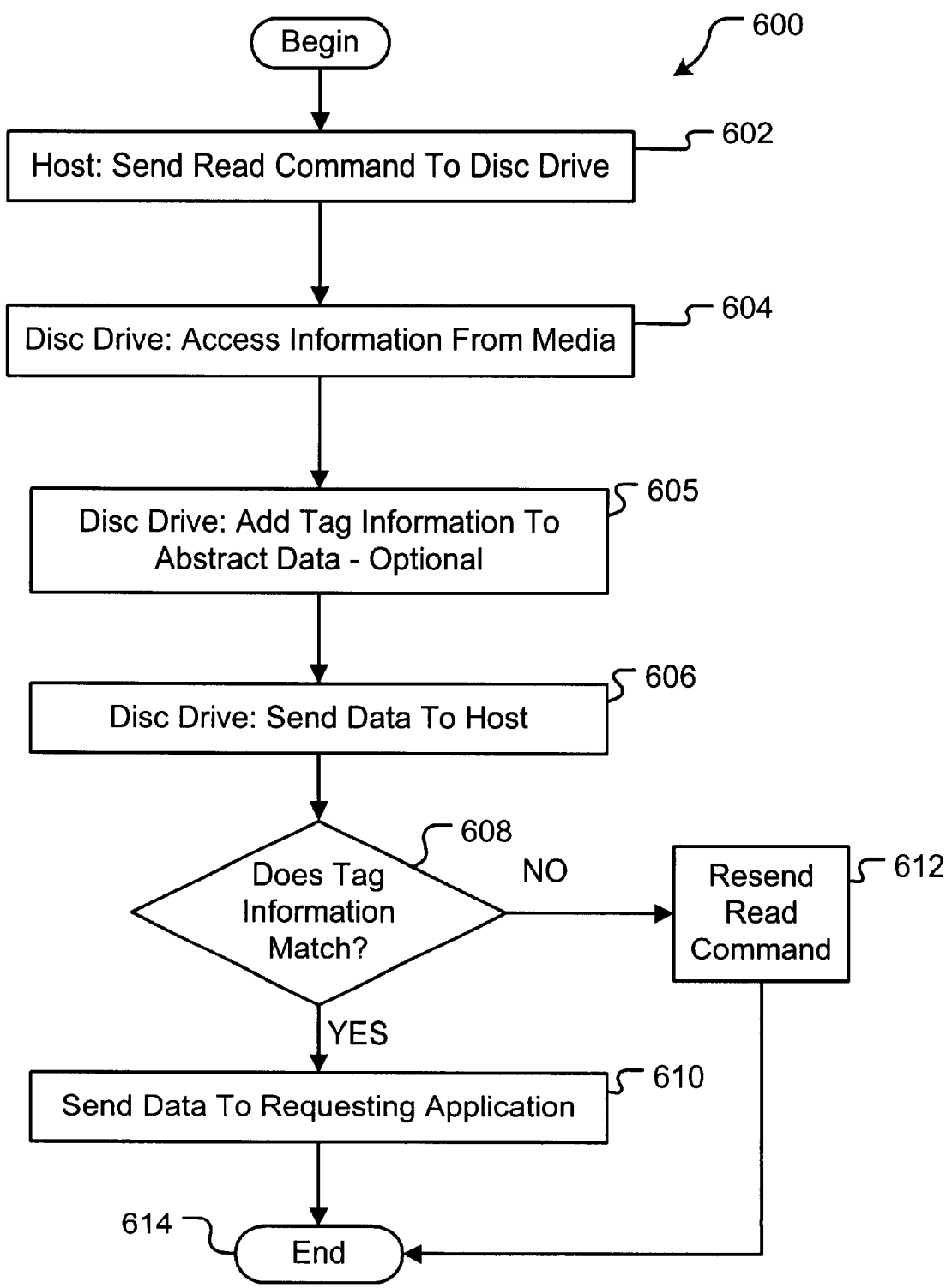
FIG. 6 illustrates a flow chart of functional operations related to reading data from a storage media in accordance with aspects of the present invention.

FIG. 6 illustrates the functional components or operational flow characteristics 600 related to reading data from a storage media in accordance with certain aspects of the present invention. Prior to the beginning of flow 600, abstract data has been created by the application module, such as module 320, and stored on a storage media, such as media 316 (FIG. 3). Additionally, prior to flow 600 the application module 320 or some other module sends a request to the file system 322 requesting the abstract data. Consequently, the file system, or some other module, initiates the flow 600 in order to retrieve the data.

Flow 600 begins as request operation 602 sends a request to the disc drive indicating a read operation should be performed. In this case the read operation is provided by the host system and the operation itself relates to the recovery of abstract data that has been previously stored on the storage media 316. The read request is conducted along the data path, such as path 310, and includes an identification value indicating which data should be read from the storage media. Additionally, the read command may provide some indication that tags are to be provided along with the abstract data. The read command may also include some tag information, provided by the host system.

Following receipt of the read request, access information operation 604 accesses the desired information on the storage media. In one embodiment, the information is read from the storage media and temporarily stored in a disc drive buffer, such as buffer 312 shown in FIG. 3. While the data is being read from the storage media and stored into the buffer, add operation 605 may be employed to add tag information to the abstract data. Essentially, in order to provide validation capabilities to the host system, the abstract data must be associated with tag information that can be tested by the host system. If the abstract data was stored to the storage media without tag information, then the tag values must be added prior to sending the data to the host system. In this case, optional step 605 adds the tags to the abstract data. Alternative embodiments may involve the storing of tag values onto the storage media and thereby eliminating the need to add tag values at step 605. Yet, in those embodiments, the host must be provided the stored tag values to allow for a meaningful comparison, as by another data transmission between the disc drive and the host system.

Upon reading the abstract data and storing the data in the buffer, send operation 606 sends the data to the host system. The transfer of information includes the transfer of at least one tag value along with the abstract data and may include a separate tag value for each of the different sectors of abstract data being transferred. In an embodiment, the abstract data is stored in a file system buffer, such as buffer 324 shown in FIG. 3.

Next, the data is validated by test operation 608. Essentially, the tag value or values transmitted to the host along with the abstract data are compared, at operation 608 to a control or expected value or values. In an embodiment, the control values are predetermined by the host system. In this embodiment, the host may supply a first tag value to the disc drive system along with the initial read request. The disc drive system can then store that value along with the first sector of abstract data. Then, using a predetermined algorithm, calculate other tag values for consecutive sectors. Similarly, the host can use the same algorithm to create control tag values to be used during the check operation 608. In other embodiments, the disc drive system may supply a first tag value to the host system during a separate transmission. In such a case the host may further use the first tag value received from the disc drive and calculate other, consecutive tag values for use during operation 608.

If test operation 608 determines that the tag values are correct, e.g., match the control values, then flow branches YES to send operation 610, which sends the data to the requesting application. Alternatively, an indication may be provided to the requesting application that the data has been verified and may be accessed when desired. During operation 610, the tag values may be skipped or otherwise ignored. Following send operation 610 flow 600 ends at end operation 614.

On the other hand, if test operation determines that the tag values do not match the control values, flow branches NO to resend operation 612. Resend operation resends the read command to the disc drive and effectively requests that the data be re-read and re-transmitted to the host system. More particularly, if the tag values do not match the control values, then the host recognizes that the data is not valid and thus may be corrupt. In such a case, any number of different actions may take place, such as notifying the application module, trying other read operations, or simply attempting to reread the data as shown in FIG. 6. Following resend operation 612 flow 600 ends at end operation 614.

In a particular embodiment, the abstract data is initially stored with a CRC value that is calculated over the abstract data and an LBA value. (sequential value of a sector 0 to N) According to particular disc drive operations, the CRC value is checked after injecting the LBA value into the data path between the storage media and the buffer, such as buffer 312 by the disc drive prior to storing the data into the buffer 312. This operation provides for a validating step during the actual read operation prior to storing the information in the disc drive buffer 312. Next, as the data is transmitted to the host interface, such as interface 306 (FIG. 3), the CRC is checked with the LBA value and the LBA may then be replaced with a tag value. Data is then transmitted to the host as in operation 606 and flow continues as discussed above.

Figure 7:
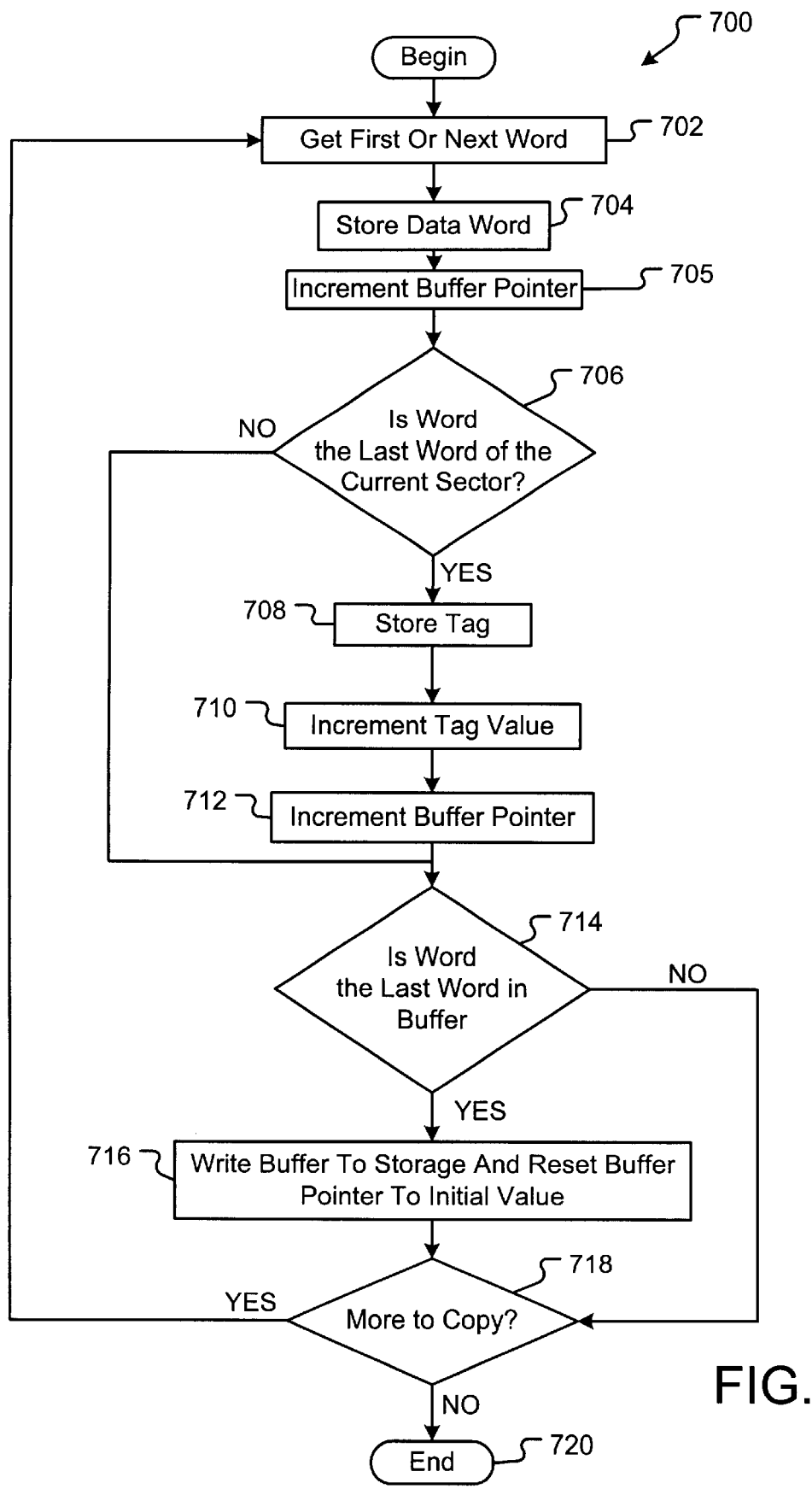
FIG. 7 illustrates a flow chart of functional operations relating to inserting verification tags in the user buffer in accordance with a particular embodiment of the present invention.

FIG. 7 illustrates the functional components or operational flow characteristics related to adding tag values to sectors in a buffer as abstract data is being stored in the buffer. Flow 700 essentially relates to a particular embodiment of placing the information in the buffer with tag values to be checked or compared at a later time to determine the validity of the data. Flow 700 further relates to the addition of tags at the end of each sector, such as the sector/tag relationship shown in FIG. 4.

Flow 700 begins with get first word operation 702. Get operation 702 gets the first word to be stored in the buffer, such as buffer 324 shown in FIG. 3. Next, store operation 704 stores the data word in the buffer. Following store operation 704, determine operation 706 determines whether the word is the last word of the current sector. If not, then more words may be stored in the sector and thus flow branches NO to increment operation 707 which increments the buffer pointer. Following the increment operation 707, flow branches back to get operation 702, which gets the next word to be stored in the buffer.

If determination operation 706 determines that the current word is the last word in the current sector, then flow branches YES to store operation 708. Store operation 708 stores a tag value in the buffer. In an embodiment, the tag value is appended to the sector such that the sector size remains the same independent of the size of the tag value. In alternative embodiments, the tag value may actually be stored within the sector, such that the determination step 706 essentially determines that no more abstract data words can fit in the current sector, leaving room for the tag value. In yet other embodiments, the tag value may be stored independently of the abstract data and merely associated with the abstract data sector.

Once the tag value has been stored at operation 708, increment tag value operation 710 increments the tag value. That is, in an embodiment, the first tag value for a portion of data is a random number value and each consecutive tag value is calculated by incrementing the first number a predetermined amount, e.g., by adding one. Operation 710 performs the act of incrementing the tag value.

Next, determination operation 714 determines whether the most recent word stored to the buffer is the last word in the buffer. Essentially, the buffer may hold only a predetermined number of words and once the buffer is full, then the information must be transferred. In this case, determination operation 714 determines whether the buffer is full. If so, then flow branches YES to write operation 716. Write operation transmits the data to the storage device and resets the buffer pointer to an initial value.

Following write operation 716, or if determination operation 714 determines that the word is not the last word in the buffer, test operation 718 tests whether more words need to be copied. If so, then flow branches YES to get operation 702, which gets the next word. Otherwise, then flow ends at end operation 720. Prior to ending, an additional operation of writing any unwritten data to the storage media may be performed, depending on whether all information has been stored to the media or not.

As may be appreciated, the flow 700 implements the pseudo code shown in Table 1.

TABLE 1

Pseudo Code for Storing Tag Values in Buffer

While more to copy do:
   store data word.
   increment buffer pointer.
   if last word of sector then
      store tag,
      increment buffer pointer, and
      increment tag value.
   if last word of buffer then
      write buffer to storage and set buffer pointer to beginning.

Figure 8:
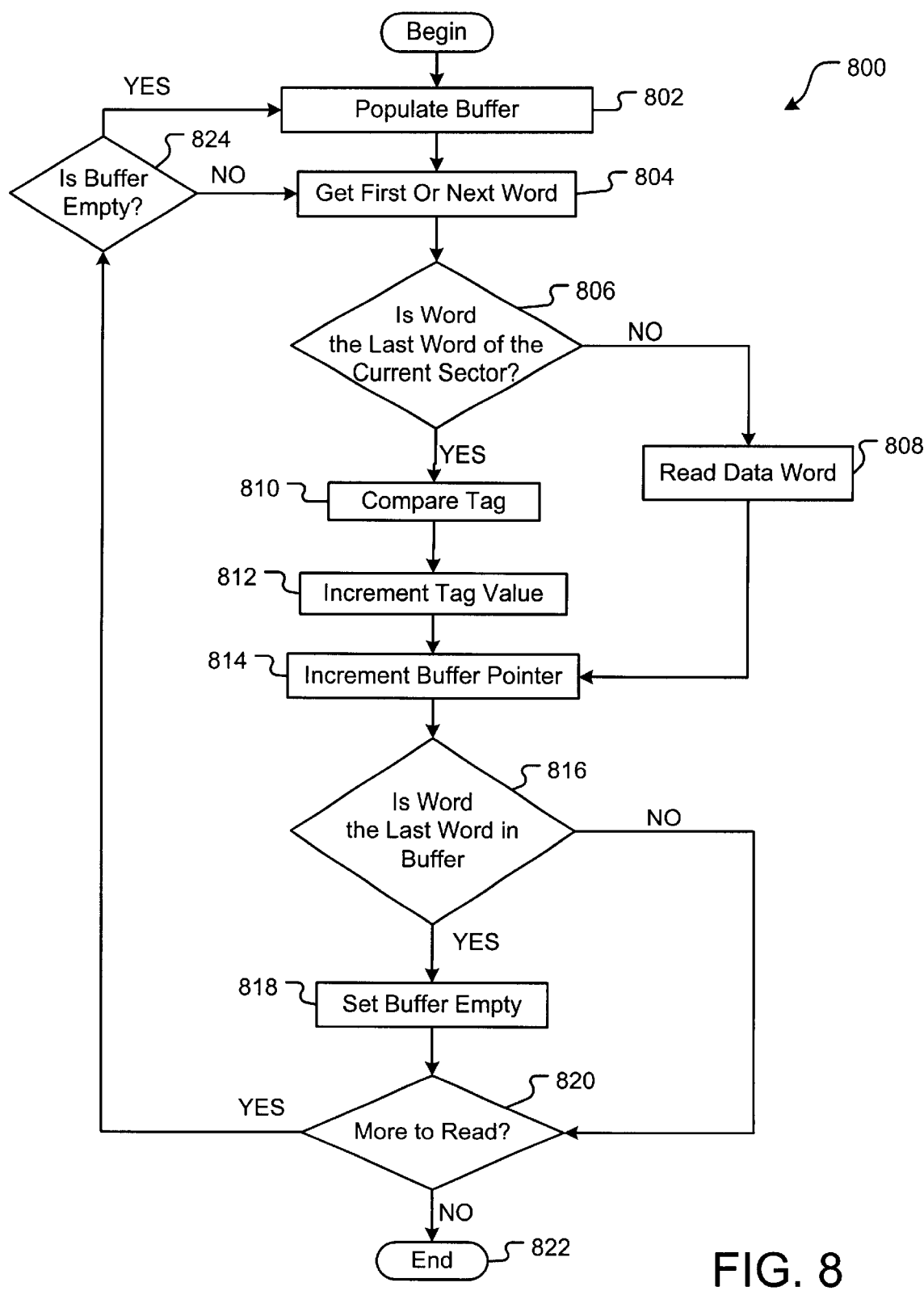
FIG. 8 illustrates a flow chart of functional operations relating to reading data from storage media in accordance with a particular embodiment of the present invention.

FIG. 8 illustrates the functional components or operational flow characteristics related to actually comparing tag values associated with consecutive sectors following the transfer of information along the data path, such as during compare operation 514 and 608 shown and described above in conjunction with FIGS. 5 and 6, respectively. Hence, flow 800 may be performed by the disc drive 302 system during a write operation or by the host system 304 during a read operation. In particular however, flow 800 relates to the comparison of tag information stored in a manner similar to the manner shown and described above in conjunction with FIG. 7.

Flow 800 begins with populate operation 802. Essentially, according to this embodiment, the information is first stored in the buffer and then the comparisons are made. Consequently, in order to compare data tag values, the buffer itself must be populated. Populate operation 802 may relate to accessing information from the host user buffer 324 and transmitting it to the disc drive buffer 312, such as during a write operation, or transferring information from the disc drive to the user buffer 324, such as during a read operation.

Next, get operation 804 gets the first word. Upon getting the first word, determine operation 806 determines whether the word is last word of the current sector. If not, then the data word may be read at operation 808. Otherwise, flow branches YES to compare operation 810. Compare operation actually performs the comparison between a predetermined tag value and the tag value stored in association with the current sector.

Following compare operation 810, increment tag value operation 812 increments the tag value related to the control or predetermined tag. Next, increment buffer pointer operation 814 increments the buffer pointer to move to the next word in the buffer.

Upon incrementing the buffer pointer 814, determine operation 816 determines whether the current word is the last word in the buffer. If so, then flow branches YES to set operation 818, which sets the buffer to empty.

Once set to empty, or upon determining that the current word is the last word in the buffer, determination operation 820 determines whether more words should be read and therefore validated. If not, then flow 800 ends at end operation 822.

If, on the other hand, determination operation 820 determines that more words need to be read, flow branches YES to test operation 824. Test operation 824 tests the buffer to determine if the buffer is empty. If so, then flow branches YES to populate operation 802, initiating flow 800. Otherwise flow branches NO to get next word operation 804, also initiating the remainder of flow 800.

As may be appreciated, the flow 800 implements the pseudo code shown in Table 2.

TABLE 2

Pseudo Code for Comparing Tag Values in Buffer

While more to read do:
   if buffer is empty then read storage to buffer.
   if last word of sector then compare tag and increment tag value.
   else, read data word.
   increment buffer pointer.
   if end of buffer then set buffer empty.

Using the flow shown and described in FIG. 8, each sector may be read from the buffer and each tag compared against a predetermined tag value. Following flow 800, if the data is validated then the data may be stored to the media, such as during a write operation, or the requesting application is allowed to access the data, such as during a read operation. Otherwise, the data is invalidated and any number of error handling routines may be implemented. Importantly, the disc drive system described above has the information and ability to determine whether the data requested to be stored to the media is the same as the data that is actually received and/or stored to the media. Similarly, the disc drive works in connection with the host computer system to provide analysis techniques during a read operation.

The embodiments described above are particularly useful in validating the data path by inserting known or expected tag values into the data stream. Consequently, the tags are associated with corresponding data in a physical manner, i.e., the tags are physically next to the data in the data stream. Other embodiments, described below provide a method and means for associating tag information in locations apart from the data actually described. Moreover, the embodiments described below provide the added benefit of validating the abstract data, as opposed to just the tag values. In order to achieve data validation, additional overhead/processing is implemented to calculate error detection or correction values and these values are then associated with the tag information and the non-abstract data. Depending on particular design requirements, lower overhead systems may prefer using the tag insertion method described above. However, when validating data is a high priority, the following embodiments may be preferred.

Figure 9:
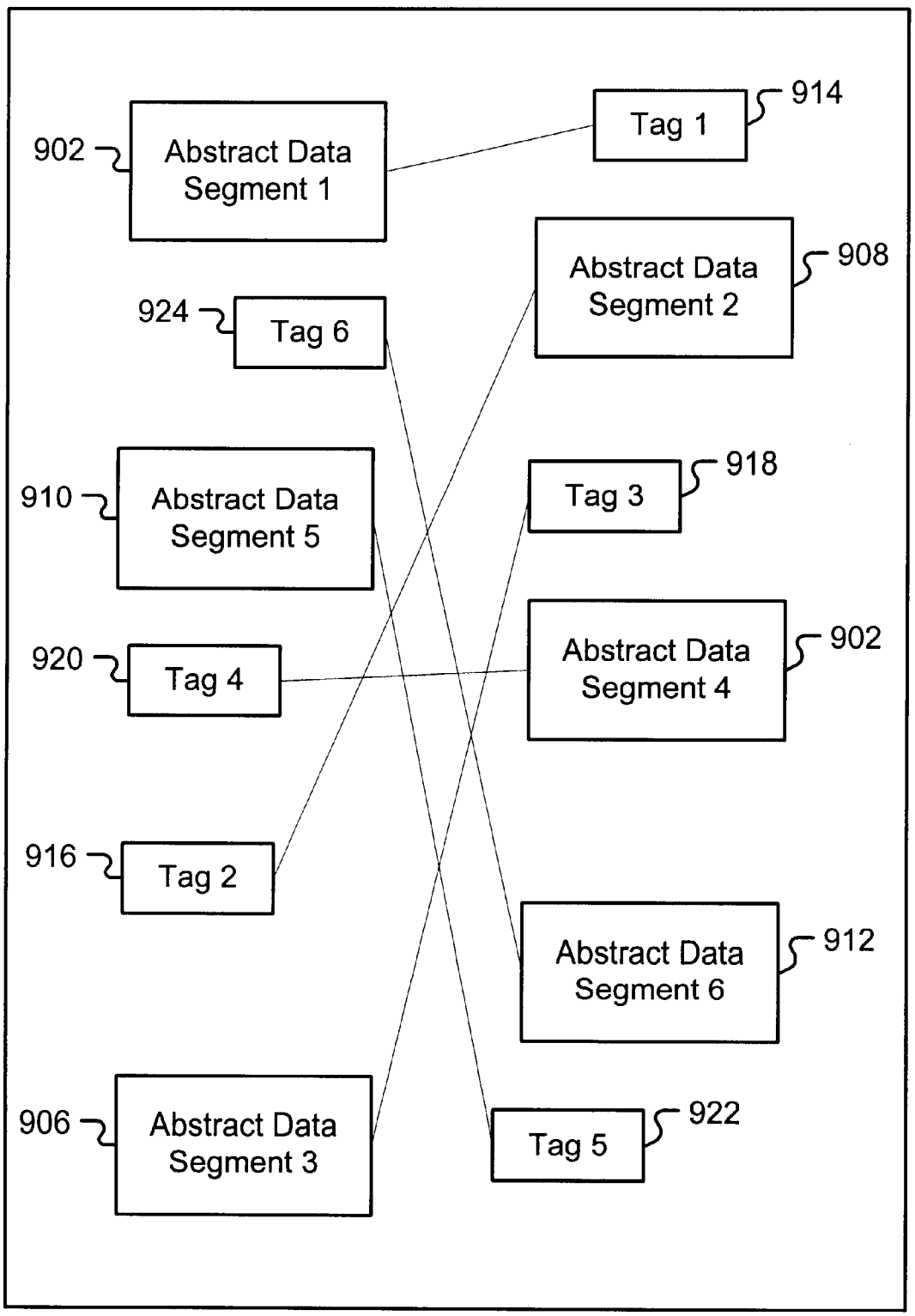
FIGS. 9 and 10 illustrate different user buffer representations, each indicating non-abstract or tag information stored separate from associated user data or abstract information.

A conceptual memory layout showing scattered abstract and non-abstract data is shown in FIG. 9. The abstract data blocks 902, 904, 906, 908, 910 and 912 illustrate some of the potentially many abstract data blocks scattered throughout the memory 900. Similarly, the memory 900 also contains non-abstract data or tags, such as tags 914, 916, 918, 920, 922 and 924. As described above, each tag is associated with at least one abstract data block. In this embodiment, each tag is scattered in relation to the associated abstract data block. Scattered data relates to data that is not physically located near other associated data. Consequently, as shown in FIG. 9, abstract data block 902 is associated with the tag 914, but the two data portions are not necessarily physically next to each other, as they are shown in FIG. 4 above. Similarly, abstract data block 904 is associated with but not physically near tag 916; abstract data block 906 is associated with but not physically near tag 918; abstract data block 908 is associated with but not physically near tag 920; abstract data block 910 is associated with but not physically near tag 922; and abstract data block 912 is associated with but not physically near tag 924.

Figure 10:
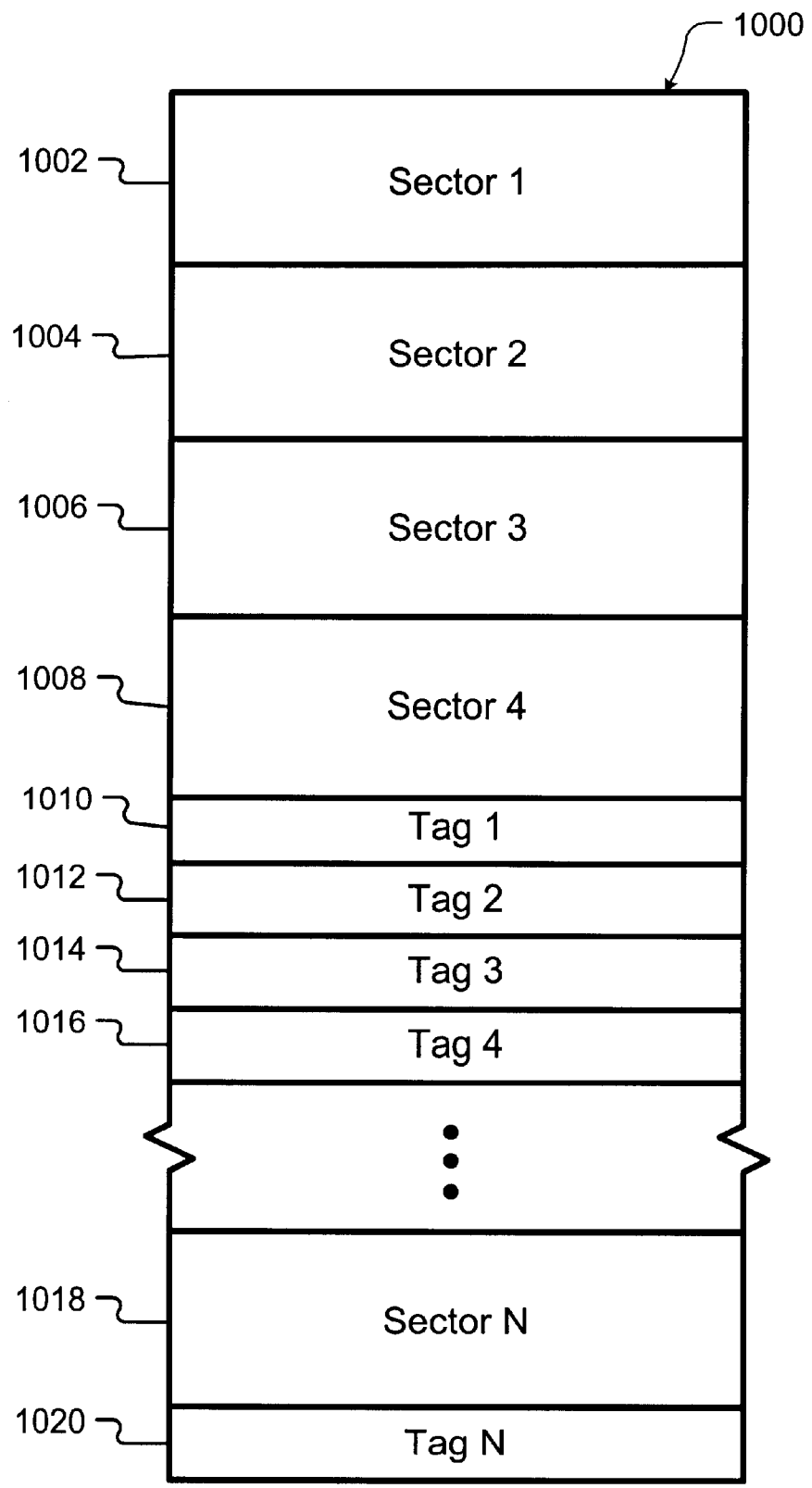

FIG. 10 illustrates another view of memory that further illustrates the concept of scattering data blocks in memory apart from associated tags. The abstract data blocks are shown as sectors 1002, 1004, 1006 and 1008. Of course there may be other sectors, such as demonstrated by the Nth sector 1018. Also, the memory 1000 has tags, i.e., tags 1010, 1012, 1014, 1016 and 1020, which are associated with sectors 1002, 1004, 1006, 1008 and 1018, respectively. However, as shown in FIG. 10, the tags are not necessarily located next to their associated sectors.

In order to manage the scattered information a table may be maintained by the system. An exemplary table is shown below in Table 3. The table has address information for each sector in memory and address information for the associated tag. Additionally, the table may further include other information, such as error correction or data verification information. In an embodiment, the additional information relates to a calculated CRC value, where the CRC was calculated using a predetermined algorithm that used the non-abstract tag value and the abstract data to compute the CRC value. In this case Table 3 illustrates the N sectors and the associated tags shown in FIG. 10.

TABLE 3

Memory Map for Tags and Associated Sectors

| Number | Sector | Tag | Additional Information |
|---|---|---|---|
| 1 | Address, Length | Address | CRC Value |
| 2 | Address, Length | Address | CRC Value |
| 3 | Address, Length | Address | CRC Value |
| 4 | Address, Length | Address | CRC Value |
| N | Address, Length | Address | CRC Value |

The memory map or lookup table is used to supply the correct tag value to the disc drive system, such as system 302 shown in FIG. 3 during a write command. Additionally, during the write process, as data is being collected to be sent to the disc drive system, the CRC value is inserted into the data stream next to its associated sectors. This process is similar to inserting the tag value in the data stream, such as in operation 605 which is shown and described above in conjunction with FIG. 6. Once the disc drive receives the tag value, as a parameter in the write command itself, and the abstract data, the drive recalculates the CRC value over the tag value and the abstract data. The disc drive is then able to compare the recalculated CRC value to the received CRC value and therefore validate the abstract data. I.e., when the CRC values match, then there is very high probability that the data is valid, and therefore the process validates the data itself.

Figure 11:
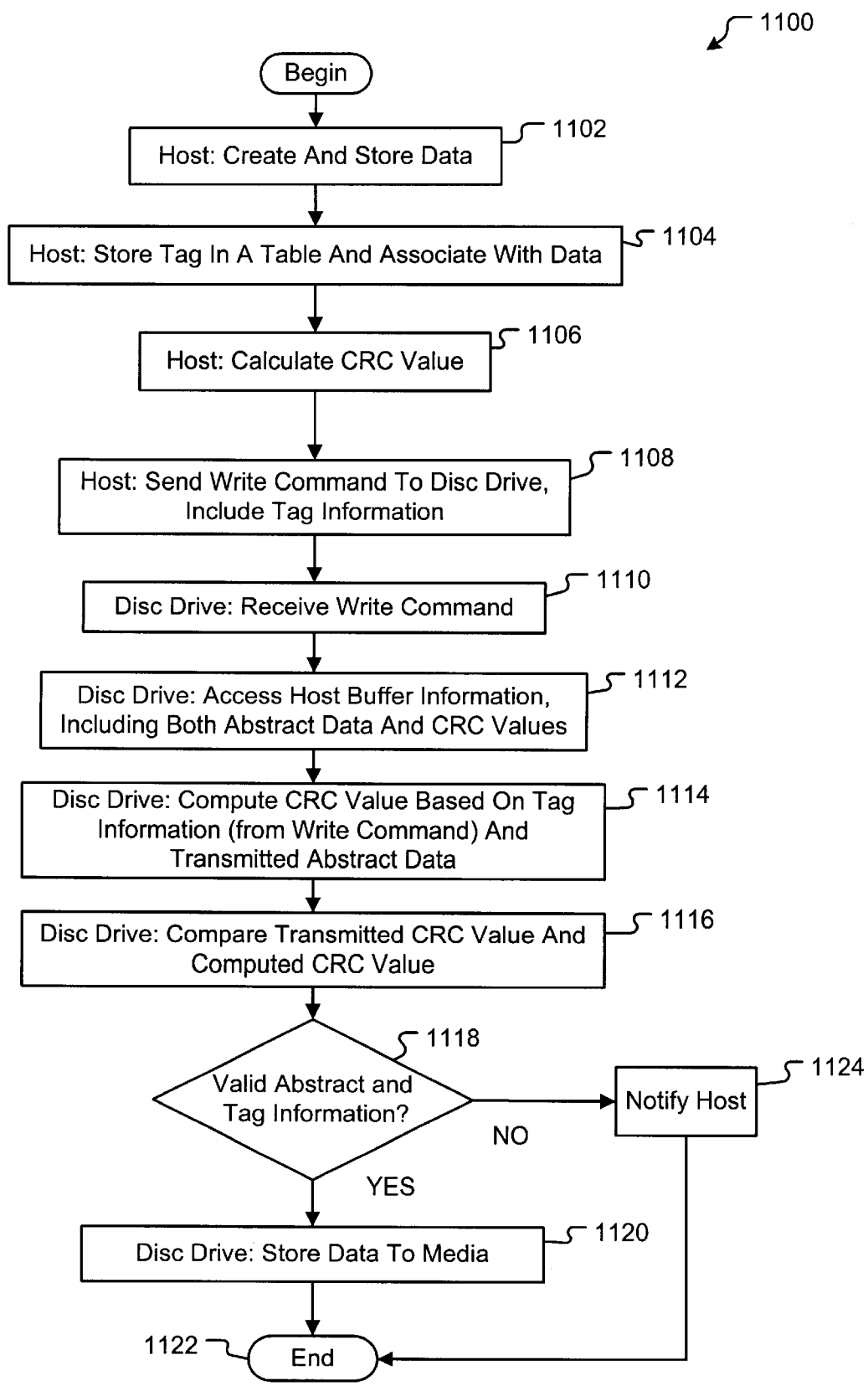
FIG. 11 illustrates a flow chart of functional operations related to writing data to a storage media in accordance with aspects of a particular embodiment of the present invention.

FIG. 11 illustrates the functional characteristics of determining a tag value and then calculating a CRC value across a certain portion of memory to ultimately transmit to a disc drive system that validates the data. FIG. 11 illustrates the functional components or operational flow characteristics related to storing tag values in memory that are related to sectors in a buffer as abstract data is being stored. As may be appreciated, many of the operations are similar to those shown and described above with respect to FIG. 5. Consequently, flow 1100 essentially relates to placing the abstract information in the buffer in association with tag values to be checked or compared at a later time to determine the validity of the data. Flow 1100 further relates to the particular embodiment calculating CRC values using the abstract data and the tag value and storing the CRC value with the abstract data.

Flow 1100 begins with operation 1102. Operation 1102 relates to the creation of abstract data by the application module, such as module 320 or some other module in the system 304. Upon creation, the data is stored in the buffer, such as user buffer 324, dividing the information into sectors. Create and store operation is similar to operation 502 shown and described above in conjunction with FIG. 5.

Operation 1104 relates to the creation and storing of an associated non-abstract tag to the buffer to mark the data with a unique value, creating data/tag pairs. Instead of storing the tag value to the end of each sector, however, the tag value is stored in a separate table, such as a table similar to lookup Table 3. Alternative embodiments may use larger or smaller tags and/or provide one for more than one sector. In a particular embodiment, each consecutive sector receives a 32-bit tag that is one incremental value larger or smaller than the tag value for the previous sector as described above in conjunction with FIG. 7. In storing the tag value, the tag is associated with an abstract data portion, such as by associating it with a memory address that points to the abstract data.

In one embodiment, the file system, such as file system 322 (FIG. 3) performs the acts of storing the abstract data in the various sectors as well as the act of creating and storing tag values to the lookup table. In other embodiments however, other modules having direct access to such a buffer, such as buffer 324 (FIG. 3) may perform the act of storing either the abstract data to the buffer or the act of storing non-abstract tag values to the buffer, or, in one embodiment, both acts of storing abstract data and tag values to the buffer.

Once the data and tags have been stored in the user buffer, calculate operation 1106 calculates a CRC value across both the abstract data and the associated tag value for each data/tag pair. The CRC value is then stored in place of the tag data.

In one embodiment, the process of calculating the CRC involves first converting the abstract data and the tag value to a stream of bits, such that those bits become a polynomial. Calculate operation 1106 multiplies some of the bits by a constant, which provides a remainder. The remainder is then multiplied by the next set of bits, and so. Since only the remainder is used in the next operation, the size of the resulting number is maintained. As an example, the process may multiply two 32-bit words to create a 64-bit number, but the process only keeps the lower 32 bits and discards the upper 32 bits. Next, the remaining lower 32 bits are multiplied by next set of bits, i.e., the next 32-bit word in the sector of abstract data. Since all the carry information is lost, the final result is a 32-bit value. The 32-bit value is a unique mathematical result based on the original data such that if the process were repeated, the same 32-bit value will be created. In an embodiment, one 32-bit CRC value is calculated for each data/tag pair. Each data/tag pair comprises one sector of abstract data and an associated incrementing tag value. Upon calculating the CRC value across the abstract data and the corresponding tag value, the CRC value is stored as non-abstract data replacing the tag value. E.g., the 32-bit CRC value is stored with the original abstract data as non-abstract data.

Next, upon storing the CRC value, send operation 1108 sends a write command to the disc drive. The write command typically provides a memory address identifying the location of the first sector in the group of sectors to be written to the disc drive system as well as the number of sectors in the group. The write command also provides an indication that the CRC or tag information is stored within the buffer. Furthermore, the write command provides either a tag value for the first sector in the group or some information such that the tag value can be independently determined apart from accessing the information from the buffer itself. The write command may use the tag value stored in the lookup table.

Following send operation 1108, receive operation 1110 receives the write command. In an embodiment, the disc drive system, such as system 302 receives the command. More particularly still, the host interface 306 may receive the write command.

Upon receiving the write command, access operation 1112 begins the process of accessing host buffer information. Access operation 1112 typically relates to the steps of communicating back to the host adapter 308 and the drivers 318 that certain buffer information should be transferred to the disc drive software 302. The request simply accesses buffer data and causes the transfer of a block of such data, such as consecutive sectors, from the user buffer 324 to the disc drive system. The data, i.e., both abstract data and non-abstract tag data is then stored in or copied to the drive buffer 312.

In an embodiment, once the data has been transferred to the disc drive system 302, compute operation 1114 begins the validation process to effectively compare the tag information associated with the write command to the tag information retrieved along with the data from the user buffer 324. More specifically, compute operation computes the CRC value across the received information and determines a new CRC value. The computation uses the same initial value, e.g., the tag value set with the write command such that the newly determined CRC value will be the same as the previous CRC value the received data is the same as the original data.

Following compute operation 1114, compare operation 1116 compares the two CRC values. Such a comparison may simply involve subtracting one from the other and testing the result against zero. If the CRC values match, then operation 1118 determines that the tag and data information is valid. If so, then flow branches YES to store operation 1120 which actually stores the data on the physical media. The tag information may or may not be stored with the data. Once stored, flow ends at end operation 1122.

On the other hand, if determination operation 1118 determines that the tag information or the abstract data is not valid, i.e., the CRC values did not match, then flow branches NO to notify operation 1124 which notifies the host that the data was corrupted in some manner and that the write command should be resubmitted. Alternatively, depending on the error and the type of correction capabilities, the error may be identified and corrected, such that the host need not be notified. Upon notifying the host, flow 1100 ends at end operation 1122.

In this embodiment, by re-computing a new CRC value based on the transmitted information and the tag value delivered with the write command, and then comparing the transferred CRC value with the newly computed CRC value provides an indication that the abstract data is valid. Of course, since it is merely a redundancy check, it may not be 100% accurate, but such a check provides a good indication that the data is valid. As is known, CRC is capable of detecting within the linear stream of two 10-bit errors, such that if there were two 10 bit chunks of information that were lost or incorrect in the data path, then this process would identify the error. Consequently, the abstract data is validated to a relatively high degree of confidence.

In an embodiment, the CRC calculation may be performed in software. For example, the C program shown in Table 4 may be implemented to perform the CRC calculation as the data is stored in the buffer for one 512-byte sector. Other embodiments may implement such a calculation in hardware.

cation. A table is generated that points to the various segments of the memory in the "contiguous data" to be transferred to the disc drive. The table has basically a pointer and a length for each segment. So the Direct Memory Access (DMA) operation may be divided into several distinct operations, i.e., gathering the scattered information throughout the memory and putting the gathered information into one contiguous transmission to the DMA buffer. The transfer operation thus uses the table sequentially lookup the addresses of the segments to be transferred.

The benefits of the above-described invention relate to a storage system that can verify data in the data path. As such, the present invention may be viewed as a storage system (such as 300) for storing data onto a storage medium (such as 316) wherein the system has a host computer system (such as 202 and 304) having a user buffer (such as 324) and a disc drive system (such as 302) housing the storage medium. The system also has a data path (such as 310) connected to the host computer system (such as 202 and

TABLE 4

C Program Language for Implementing CRC functionality

```
long nect_crc_word(long cur_data, long cur_crc_word)
{ static char poly[32] = {0,0,0,0,0,1,0,0,1,1,0,0,0,0,0,1,0,0,0,1,1,1,0,1,1,0,1,1,0,1,1,1};
    static char crc[32] = {0,0,0,0,0,1,0,0,1,1,0,0,0,0,0,1,0,0,0,1,1,1,0,1,1,0,1,1,0,1,1,0};
    static long multiplier[32] = {0};
    int i,j, fb;
    long crc_gen, x;
    /* generate matrix multiplier */
    if (multiplier[0] == 0)    /* first time through */
    {  for (i=0; i<32; i++)
         {   for(j=0;j <32; j++)
               if (crc[j])
                  multiplier[i] |= 1L<<(31-j);
            fb = cr[0];
            for (j=0; j<32; j++)
               if (fb)
                  crc[j] = crc[j+1]^poly[j];    /*feedback*/
            else
                  crc[j] = crc[j+1];    /*shift*/
         }
    }
    x = cur_data^cur_crc_word;    /* [D]^[C]=[x]*/
    crc_gen = 0;                  /*[x]*[matrix]=[C]*/
    for (j=0; j<32; j++)
       if(x&(1L<<j))
          crc_gen ^=multiplier[j]
       return crc_gen;
}
void main(void)
{ static ling crc_word 0xFFFFFFFF; //seed value
    static long tag = 0x1245678; long data, buffer[129];
    for (int x+0; x<128; x++)
    {buffer[x] = data = rand(); crc_word = next_crcword(data, crc_word);} //fill with user data
    buffer[128] = next_crc_word(tag++, crc_word); //join tag and replace with CRC
}
```

Using the above system and method, the abstract data can be validated as it travels from one system to another along a data path. Moreover, since the tag and the abstract data have been "merged" in the CRC value calculation, the two values do not have to be physically next to each other in the data path. Instead, the system may just keep track of the records by use of pointers, such as in a table. In such a case, the embodiment described with respect to FIGS. 9, 10 and 11 verifies the data path and data without storing the information in a contiguous portion of memory. Since the data is algorithmically associated with the tags and that algorithm is the CRC computation used to associate the tag with the data, the data does not have to be stored in contiguous set of memory to provide the data path verifi- 304) and the disc drive system (such as 302) to provide the transfer of information between the host computer system (such as 202 and 304) and disc drive system (such as 302), the information being transferred in response to a request to transfer, the request to transfer having information related to a control value, (such as a tag values 404 or 914). Within the system there is a first buffer (such as 324 or 312) for storing abstract data to be transferred along the data path and a second buffer (such as 312 or 324) for storing abstract data received along the data path.

Additionally, there is a storage module (such as file system 322) for storing one or more identification tags (such as a tag values 404 or 914 for example) in the first buffer, each tag associated with a portion of abstract data and a comparison module (such as 311) for comparing the one or more identification tags with one or more control values based on the information received in the request to transfer. Alternatively, the comparison module (such as 311) may compare calculated error detection or CRC values, wherein the error detection values are calculated using the abstract data and the tag values. In an embodiment the first buffer (such as 324 or 312) is divided into a plurality of sectors (such as 402, 406, 410, 414 and 418) for storing abstract data and the storage module appends error detection values to the end of each sector. The system may further have a receive module (such as 306) located on the disc drive system (such as 302) for receiving the data and associated tag information, the receive module also inserts a logical block address value into each data sector.

The above specification, examples and data provide a complete description of the manufacture and use of the invention. As may be appreciated, many embodiments of the invention can be made without departing from the spirit and scope of the invention, e.g., different embodiments may use different methods of computing the error detection values and/or different embodiments may send the tag information with the abstract data, with the write command or simply calculate the tag value based on other information. Consequently, the invention resides in the claims hereinafter appended.

What is claimed is:

1. A method of verifying data transferred between a host computer system and a disc drive system along a data path, the method comprising:
   calculating a first error detection value, the error detection value relating to both an identification tag and associated data;
   transferring the data and the first error detection value along the data path;
   generating a second error detection value using the transferred data and the identification tag; and
   comparing the second error detection value to the first error detection value received with the data to determine validity of the data.

2. A method of verifying data as defined in claim 1 wherein the first and second error detection values are cyclic redundancy check values.

3. A method as defined in claim 1 wherein the first and second error detection values are calculated using the same predetermined cyclic redundancy check algorithm.

4. A method of verifying data as defined in claim 3 further comprising:
   transferring a request to transfer the data wherein the request indicates the location of the data, the request further including identification information related to the identification tag.

5. A method of verifying data as defined in claim 4 further comprising determining a control tag value based on the received identification information.

6. A method of verifying data as defined in claim 5 wherein the request to transfer information relates to a write command.

7. A method of verifying data as defined in claim 6 further comprising:
   prior to calculating the first error detection value, storing the identification tag and the associated data in a first buffer on a host computer system, wherein the first buffer is a user buffer; and
   wherein the act of storing the data into the first buffer is performed by a file system module.

8. A method of verifying data as defined in claim 6 wherein the act of storing the data into the first buffer is performed by an application module.

9. A method of verifying data as defined in claim 3 wherein the act of storing the data into the first buffer further comprises:
   dividing the first buffer into a plurality of sectors;
   storing data into the sectors; and
   maintaining a table of sectors, identification tags and error detection values, the table indicating the association between such sectors, identification tags and error detection values, and wherein each subsequent identification tag is an incremented value of the previous identification tag.

10. A method of verifying data as defined in claim 9 wherein the act of recalculating further comprises:
    determining control tag values for each sector based on information received in the request to transfer; and
    using each of the control tag values in recalculating the second error detection values.

11. A method of verifying data as defined in claim 10 wherein the first buffer is a user buffer located on the host computer system, the request to transfer information relates to a write command, the act of storing the data is performed by a file system module, and wherein the method further comprises:
    upon receiving the data and associated tag information, inserting a logical block address value into each data sector;
    calculating a cyclic redundancy check value for the sector with the logical block address;
    storing the cyclic redundancy check value onto a storage medium with the data such that the logical block address can be evaluated at a later time.

12. A method of verifying data as defined in claim 1 wherein the first buffer is a disc drive buffer located on the disc drive system.

13. A method of verifying data as defined in claim 12 wherein the request to transfer relates to a read request conducted by the host computer system to the disc drive system.

14. A computer program product readable by a computer and encoding instructions for executing the method recited in claim 3.

15. A computer program product readable by a computer and encoding instructions for executing the method recited in claim 11.

16. A storage system for storing data onto a storage medium comprising:
    a host computer system having a user buffer;
    a disc drive system having the storage medium;
    a data path connected to the host computer system and the disc drive system to provide the transfer of information between the host computer system and disc drive system;
    a first buffer for storing abstract data to be transferred along the data path;
    a second buffer for storing abstract data received along the data path;
    a storage module for storing one or more identification tags in the first buffer, each tag associated with a portion of abstract data;
    a first calculation module for calculating a first error detection value related to an identification tag and the associated portion of abstract data for the identification tag;

a second calculation module for recalculating a second error detection value related to the received abstract data and a received identification tag; and a comparison module for comparing the first and second error detection values.

17. A storage system as defined in claim 16 wherein the information being transferred along the data path is transferred in response to a request to transfer, the request to transfer having information related to an identification tag value, and wherein one or more control values are generated based on the information received in the request to transfer, the control values representing identification tag values for use in recalculating the error detection values.

18. A storage system as defined in claim 17 wherein the first buffer is a user buffer located on the host computer system, the request to transfer information relates to a write command, and wherein the error detection values relate to cyclic redundancy check values.

19. A storage system of verifying data as defined in claim 18 wherein the storage module is a file system module.

20. A storage system as defined in claim 19 wherein the first buffer is divided into a plurality of sectors for storing abstract data and the storage module appends cyclic redundancy check values to the end of each sector, wherein each subsequent cyclic redundancy check uses an identification tag that is a function of an incremented value of the previous identification tag and wherein the comparison module compares each cyclic redundancy check value with a recalculated cyclic redundancy check value, the recalculated cyclic redundancy check values using control values related to the incremented identification tag values.

21. A storage system method of verifying data as defined in claim 20 wherein the first buffer is a user buffer located on the host computer system, the request to transfer information relates to a write command, the storage module is a file system module on the host computer system, the second buffer is located on the disc drive system, the storage system further comprising:

a receive module located on the disc drive system for receiving the data and associated tag information, the receive module also inserts a logical block address value into each data sector;

a calculation module for calculating a cyclic redundancy check value for the sector with the logical block address;

an access module for storing the cyclic redundancy check value onto a storage medium with the data such that the logical block address can be evaluated at a later time.

22. A storage system as defined in claim 17 wherein the first buffer is a disc drive buffer located on the disc drive system.

23. A storage system as defined in claim 22 wherein the request to transfer relates to a read request conducted by the host computer system to the disc drive system.

24. A data storage system for verifying data transferred between a host computer system and a disc drive system along a data path, the data storage system comprising:

means for calculating a first error detection value, the error detection value relating to both an identification tag and associated data;

means for transferring the data and the first error detection value along the data path;

means for generating a second error detection value using the transferred data and the identification tag; and means for comparing the second error detection value to the first error detection value received with the data to determine validity of the data.

* * * * *